US012662854B2

(12) United States Patent
Duriez et al.

(10) Patent No.: US 12,662,854 B2
(45) Date of Patent: Jun. 23, 2026

(54) MECHANISM FOR OPENING/CLOSING A LATCH FOR A MOTOR VEHICLE DOOR LEAF

(71) Applicant: Minebea AccessSolutions France, Alfortville (FR)

(72) Inventors: Laurent Duriez, Abbeville (FR); François Debroucke, Abbeville (FR); Jérémy Paumelle, Abbeville (FR)

(73) Assignee: Minebea AccessSolutions France, Alfortville (FR)

( * ) Notice: Subject to any disclaimer, the term of this patent is extended or adjusted under 35 U.S.C. 154(b) by 24 days.

(21) Appl. No.: 18/359,340

(22) Filed: Jul. 26, 2023

(65) Prior Publication Data

US 2023/0366244 A1 Nov. 16, 2023

Related U.S. Application Data

(63) Continuation of application No. PCT/FR2022/050151, filed on Jan. 27, 2022.

(30) Foreign Application Priority Data

Jan. 27, 2021 (FR) ..................................... 21/00755

(51) Int. Cl.
*E05B 81/38* (2014.01)
*E05B 81/06* (2014.01)
(Continued)

(52) U.S. Cl.
CPC .............. *E05B 81/38* (2013.01); *E05B 81/06* (2013.01); *E05B 81/14* (2013.01); *E05B 81/18* (2013.01); *E05B 81/30* (2013.01)

(58) Field of Classification Search
CPC .......... E05B 81/38; E05B 81/06; E05B 81/14; E05B 81/18; E05B 81/30; E05B 81/20
(Continued)

(56) References Cited

U.S. PATENT DOCUMENTS 10,619,384 B2 * 4/2020 Im ........................... E05B 81/20
2001/0010427 A1 8/2001 Roos
(Continued)

FOREIGN PATENT DOCUMENTS

EP 3284885 A1 * 2/2018 ......... E05B 63/0065
WO WO-2011094736 A1 * 8/2011 ........... E05B 17/007

OTHER PUBLICATIONS

International Search Report issued in corresponding International Application PCT/FR2022/050151, mailed May 27, 2022.

*Primary Examiner* — Kristina R Fulton
*Assistant Examiner* — James Edward Ignaczewski
(74) *Attorney, Agent, or Firm* — Burris Law, PLLC

(57) ABSTRACT

The present disclosure relates to an opening/closing assistance mechanism for assisting the opening/closing of a latch for an opening. The opening/closing assistance mechanism includes an electric actuator configured to control a closing and an opening of the latch. The electric actuator includes a reducer which includes a drive device configured to perform a displacement stroke which further includes a first stroke portion for the opening of the latch and a second stroke portion for closing the latch. The reducer has a first reduction ratio on the first stroke portion and a second reduction ratio on the second stroke portion. The first reduction ratio is different from, and can be lower than, the second reduction ratio.

12 Claims, 5 Drawing Sheets

(51) Int. Cl.
*E05B 81/14* (2014.01)
*E05B 81/18* (2014.01)
*E05B 81/30* (2014.01)

(58) Field of Classification Search
USPC .......................................................... 70/278.7
See application file for complete search history.

(56) References Cited

U.S. PATENT DOCUMENTS

| | | | | |
|---|---|---|---|---|
| 2002/0063430 | A1* | 5/2002 | Amano | E05B 81/64 292/201 |
| 2004/0174021 | A1* | 9/2004 | Tensing | E05B 81/68 292/216 |
| 2018/0073284 | A1* | 3/2018 | Im | E05B 83/18 |
| 2018/0155965 | A1* | 6/2018 | Estrada | E05B 81/90 |
| 2020/0131808 | A1* | 4/2020 | Kim | E05B 81/06 |
| 2022/0034129 | A1* | 2/2022 | Im | E05B 85/26 |

* cited by examiner

MECHANISM FOR OPENING/CLOSING A LATCH FOR A MOTOR VEHICLE DOOR LEAF

CROSS-REFERENCE TO RELATED APPLICATIONS

This application is a continuation of International Application No. PCT/FR2022/050151, filed on Jan. 27, 2022 which claims priority to and the benefit of FR 21/00755 filed on Jan. 27, 2021. The disclosures of the above applications are incorporated herein by reference.

FIELD

The present disclosure relates to the field of latches for a motor vehicle door leaf, in particular a mechanism for opening and/or closing the latch of a motor vehicle door leaf.

BACKGROUND

The statements in this section merely provide background information related to the present disclosure and may not constitute prior art.

A motor vehicle door leaf is movable between an open position and a closed position of the door leaf. It generally includes a latch movable between an open position and a closed position of the latch. When the latch is in the closed position, it allows blocking the door leaf in the closed position. Alternatively, when the latch is in the open position, it allows unlocking the door leaf, such that it can pass from the closed position to the open position. The latch also makes it possible to lock and unlock the closed position of the door leaf. Locking prohibits the opening of the door leaf. In general, the locking/unlocking of the latch is carried out mechanically by a user, thanks to the insertion of a mechanical key, or electrically thanks to a microcontroller which controls the latch, via a "plip" on the key for example. In this case, for example, the memory of the microcontroller stores the locking state.

More particularly, the passage from the open position to the closed position of the door leaf includes several steps:

- a step of moving the door leaf towards a frame of the vehicle, and
- a step of closing the latch in which the door leaf is secured to the frame.

In addition, the passage from the closed position to the open position of the door leaf includes several steps:

- a step of opening the latch in which the door leaf is detached from the frame, and
- a step of displacing the door leaf away from the frame of the vehicle.

The latch may be fitted with an electric mechanism for opening/closing the latch, allowing a user to remotely control the opening and closing of the latch. This is also referred to as an assistance mechanism for opening/closing the latch.

The latch typically includes a bolt intended to be moved, for example by pivoting, around a striker fixed to the frame of the motor vehicle, and a pawl configured to authorize or prohibit the movement of the bolt due to the action, for example, of a handle of the door leaf. The bolt is movable in one direction in order to ensure the closing of the latch, and in the opposite direction in order to allow the opening of the latch.

A mechanism for assisting the opening/closing of the latch generally includes electric actuators configured to authorize or prohibit the movement of the bolt and thus allow the closing of the latch, and to authorize or prohibit the movement of the pawl and thus allow the opening of the latch.

More specifically, known electric actuators include a first electric actuator dedicated to opening the latch, configured to electrically actuate the pawl, and a second electric actuator dedicated to closing the latch, configured to electrically actuate the bolt. Consequently, these latch opening/closing assistance mechanisms are massive and have complex kinematics.

A known solution includes producing an assistance mechanism for opening/closing the latch, including a single electric actuator to perform both the function of opening the latch and of closing the latch. However, the power required to open the latch is different from the power required to close the latch. Indeed, in closing it is necessary to have a high torque, while in opening it is necessary to have a high speed. In order to increase the torque, a reducer is placed in the electric actuator. This is referred to as a geared motor. Consequently, these known solutions have the disadvantage of being speed-limited.

The teachings of the present disclosure overcome these and other issues associated with mechanisms for opening and closing the latch of a motor vehicle door leaf.

SUMMARY

This section provides a general summary of the disclosure and is not a comprehensive disclosure of its full scope or all of its features.

In one form, the present disclosure provides a mechanism for assisting the opening/closing of a latch for a door leaf. The mechanism for assisting the opening/closing includes an electric actuator configured to control closing and opening of the latch. The electric actuator is associated with a reducer which includes a drive device configured to perform a displacement stroke including a first stroke portion for opening the latch and a second stroke portion for closing the latch. The reducer has a first reduction ratio on the first stroke portion and a second reduction ratio on the second stroke portion, the first reduction ratio being different from the second reduction ratio.

In other words, the opening/closing assistance mechanism includes a reducer having a first reduction ratio when the electric actuator controls the opening of the latch and a second reduction ratio when the electric actuator controls the closing of the latch, the first reduction ratio being different from the second reduction ratio.

By reduction ratio, it should be understood the ratio of a speed of a movement at the output of the reducer to a speed of a movement at the input of the actuator.

Thus, the opening/closing assistance mechanism according to the present disclosure has a reduced bulk compared to typical opening and closing assistance mechanisms. In addition, the availability of the opening and closing functions of the latch is improved, the kinematics being immediately available.

Indeed, the kinematics for steering the closing and opening chains of the latch is the same. Only the reducer is different.

According to other features of the present disclosure, the opening/closing assistance mechanism includes one or several of the following optional features, considered alone or in all possible combinations.

According to one feature, when the drive device performs the first stroke portion, the reducer is configured to generate a first torque and when the drive device performs the second stroke portion, the reducer is configured to generate a second torque, the second torque being higher than the first torque.

The ratio between the first torque and the second torque can be between 3 and 5.

The ratio between the first torque and the second torque can be equal to 4.

According to one feature, when the drive device performs the first stroke portion, the reducer is configured to generate a first speed and when the drive device performs the second stroke portion, the reducer is configured to generate a second speed, the first speed being higher than the second speed.

The ratio between the first and second speeds is inverse to the ratio between the first and second torques.

The ratio between the second speed and the first speed can be between 3 and 5.

The ratio between the second speed and the first speed can be equal to 4.

According to one feature, the first stroke portion is performed in a first direction of displacement and the second stroke portion is performed in a second direction of displacement, opposite to the first direction of displacement.

Alternatively, the first stroke portion and the second stroke portion are performed in the same direction of displacement.

According to one feature, the first reduction ratio is lower than the second reduction ratio. Thus, a high torque is provided for the closing function and a high speed is provided for the opening function.

In one form, the reducer includes a first lever arm controlled in displacement by the drive device when the drive device performs the first stroke portion, and a second lever arm controlled in displacement by the drive device when the drive device performs the second stroke portion.

According to another feature, the second lever arm is shorter than the first lever arm. Thus, the resulting reduction ratio is smaller with the first lever arm, so as to generate a displacement speed. The second lever arm makes it possible, instead, to generate a torque.

According to one feature, the drive device is a wheel.

According to one feature, the reducer includes a transmission device configured to be driven by the drive device, and to drive the first and second lever arms.

The drive device may be a wheel the displacement stroke of which is a rotation.

The transmission device may be a wheel the displacement stroke of which is a rotation.

The second lever arm can be disposed on the transmission device so that the transmission device has an axis of rotation coinciding with the second axis of rotation of the second lever arm. Thus, it may be possible to simplify the kinematics of the assistance mechanism, the kinematics being adapted to the supply of different powers between the closing and the opening of the latch.

According to one feature, the transmission device includes a pin disposed axially on the transmission device, and the first lever arm includes a gate configured to be driven by the pin when the drive device performs the first stroke portion.

According to one feature, the transmission device is a wheel forming a gear assembly with the drive device.

According to one feature, the pin is configured to pass from a first side of the gate to a second side of the gate when the drive device performs the first stroke portion. Thus, the pin is configured to pass from the first side of the gate to the second side of the gate after having driven the first lever arm to allow the opening of the latch.

According to one feature, the pin is configured to pass from the second side of the gate to the first side of the gate when the drive device performs a third stroke portion. In this manner, the pin is ready again to drive the first lever arm via the gate when the drive device performs the first stroke portion. This resetting is automatic and makes it possible to refrain from further action, for example via a switch. It can take place at any time during the latch opening/closing cycle.

According to one feature, the latch includes a bolt and a pawl, movable between an open position of the latch and a closed position of the latch, the first lever arm being configured to drive the pawl in the open position of the latch, and the second lever arm being configured to drive the bolt in the closed position of the latch.

In another form, the reducer includes a planetary gear train.

According to this form, the reducer includes an output shaft controlled in displacement by the drive device when the drive device performs the first stroke portion, and when the drive device performs the second stroke portion, the first stroke portion corresponding to a displacement in a first direction of displacement and the second stroke portion corresponding to a displacement in a second direction of displacement opposite to the first direction of displacement.

According to one feature, the latch includes a bolt and a pawl movable between an open position of the latch and a closed position of the latch, the output shaft being configured to drive the bolt into the closed position of the latch when the drive device performs the second stroke portion, and the output shaft being configured to drive the pawl into the open position of the latch when the drive device performs the first stroke portion.

The output shaft corresponds to a single lever arm.

According to one feature, the planetary gear train includes a first stage such as a planet carrier, and a second stage, such as a satellite, the output shaft being controlled in displacement by the drive device via the second stage, in order to generate the second torque allowing the closing of the latch, when the drive device performs the second stroke portion. Thus, the second stage is a transmission device configured to be driven by the drive device, and to drive the output shaft when the drive device performs the second stroke portion. The first stroke portion can be performed in a first direction of rotation, and the second stroke portion can be performed in a second direction of rotation opposite to the first direction of rotation. The first torque and the second torque can be the first torque and the second torque generated by the planetary gear train, for example at the output shaft.

According to one feature, the first stage is configured to be locked when the drive device performs the second stroke portion, and the second stage is configured to be locked when the drive device performs the first stroke portion, in order to generate the first speed allowing the opening of the latch.

The planetary gear train may include one or the first stage, for example one or the planet carrier, and one or the second stage, for example one or the planet gear. The first stage can present an axis of rotation, for example a first axis of rotation. The rotation of the first stage around the first axis of rotation can be allowed in a first direction of rotation around the first axis of rotation and blocked in a second direction of rotation around the first axis of rotation opposite to the first direction of rotation around the first axis of rotation. The second stage may have an axis of rotation, for example a second axis of rotation, around which the rotation of the second stage is allowed in a first direction of rotation around the second axis of rotation and blocked in a second direction of rotation around the second axis of rotation, for example opposite to the first direction of rotation around the second axis of rotation. It may thus be possible to simplify the kinematics of the assistance mechanism, the kinematics being adapted to the supply of different powers between the closing and the opening of the latch.

The first direction of rotation around the first axis of rotation and the first direction of rotation around the second axis of rotation can correspond to the same direction of rotation. The second direction of rotation around the first axis of rotation and the second direction of rotation around the second axis of rotation can correspond to the same direction of rotation. It may thus be possible to further simplify the kinematics of the assistance mechanism, the kinematics being adapted to the supply of different powers between the closing and the opening of the latch.

The present disclosure also concerns a latch which includes a mechanism for assisting the opening/closing as described previously and a bolt and a pawl movable between an open position of the latch and a closed position of the latch. The drive device is configured to drive the bolt into the closed position of the latch when the drive device performs the second stroke portion, and the drive device is configured to drive the pawl into the open position of the latch when the drive device performs the first stroke portion.

The present disclosure further concerns a door leaf and a motor vehicle including a latch as previously described.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
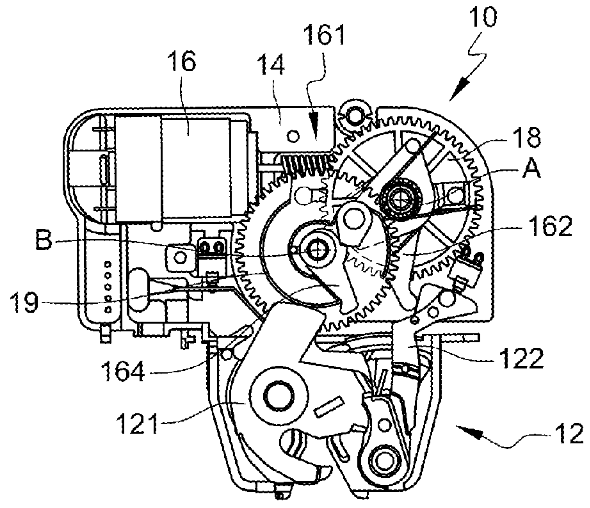
FIG. 1 is a partial schematic view of a mechanism for assisting the opening/closing of a latch for a door leaf according to a first form of the present disclosure, seen from a first side.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 14:
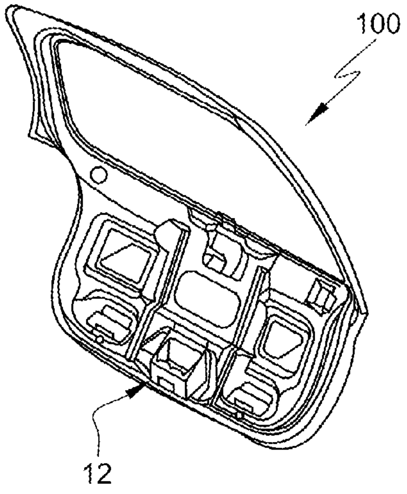
FIG. 14 is a schematic view of a door leaf, herein a tailgate, including a latch including an assistance mechanism for opening/closing the latch according to the present disclosure.

FIGS. 1 to 10D represent an opening/closing assistance mechanism 10 of a latch 12 for a door leaf 100 of a motor vehicle (FIG. 14), according to a first form. The latch 12 (partially represented), is integrated, for example, in a housing 14 partially represented in FIG. 1. The latch 12 is movable between an open position (FIG. 8) and a closed position (FIGS. 6A-6D) of the latch. When the latch 12 is in the closed position, it blocks the door leaf 100 in the closed position. Alternatively, when the latch 12 is in the open position, it unblocks the door leaf 100, so that the door leaf 100 can pass from the closed position to the open position. The latch 12 can be an electric latch.

Figure 8:
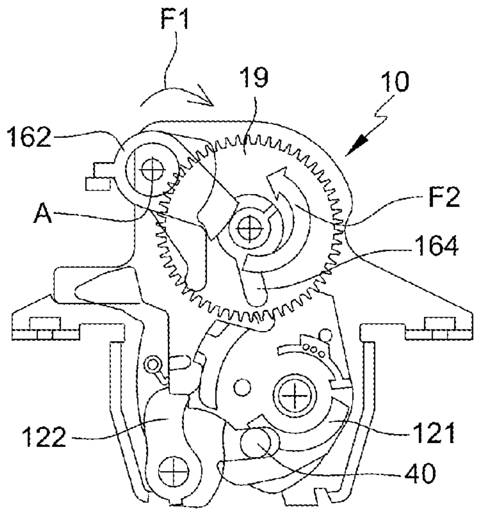
FIG. 8 is a partial schematic view of the opening/closing assistance mechanism of FIG. 1, similar to FIG. 7 but illustrating a continuation of the action of closing a latch.

The latch 12 may include a bolt 121 and a pawl 122 movable between the closed position of the latch (FIGS. 6A-6D) and the open position of the latch (FIG. 8).

In addition, the opening/closing assistance mechanism 10 includes an electric actuator 16 configured to control the closing and opening of the latch 12.

The actuator 16 is associated with a reducer 161 including a drive device 18 configured to perform a displacement stroke including a first stroke portion for opening the latch, and a second stroke portion for closing the latch.

The opening/closing assistance mechanism 10 includes the electric actuator 16 and the reducer 161.

The reducer 161 has a first reduction ratio for opening the latch 12, that is to say, on the first stroke portion, and a second reduction ratio for closing the latch 12, that is to say, on the second stroke portion. The second reduction ratio is different from the first reduction ratio.

The reducer 161 then has a first reduction ratio when the electric actuator 16 controls the opening of the latch 12, and a second reduction ratio when the electric actuator 16 controls the closing of the latch 12.

The actuator 16 is configured to control the drive device 18.

In the represented forms, the actuator 16 is a rotary actuator, rotatably movable in order to control the closing and the opening of the latch via the drive device 18.

In a variant not represented, the actuator 16 could be movable in translation, for example. This is referred to as a linear actuator.

The opening/closing assistance mechanism 10 makes it possible to perform a function for assisting the opening and the closing of the latch 12, allowing a user to remotely control the opening and the closing of the latch 12.

The drive device 18 can be a wheel the displacement stroke of which is a rotation.

The first stroke portion and the second stroke portion of the drive device 18 can be performed in the same direction of movement (FIGS. 3 to 9).

In a variant not represented, the first stroke portion of the drive device 18 can be performed in a first direction of displacement, and the second stroke portion can be performed in a second direction of displacement opposite to the first direction of displacement.

The first reduction ratio is advantageously lower than the second reduction ratio. In this manner, a torque provided for closing the latch is higher than that provided for opening the latch, while a speed provided for opening the latch is higher than that for closing the latch.

The reducer 161 may include at least one lever arm (e.g., lever arm 162 and/or lever arm 164), controlled in displacement by the drive means 18 when the drive means 18 performs the first stroke portion and/or the second stroke portion. The at least one lever arm (e.g., lever arm 162 and/or lever arm 164) can be configured to control the opening and/or closing of the latch.

In the example provided, the reducer 161 can include the first lever arm 162 controlled in displacement by the drive device 18 when the drive device 18 performs the first stroke portion. Thus, the first lever arm 162 is controlled in displacement when the actuator 16 controls the opening of the latch.

The reducer 161 may include a second lever arm 164 controlled in displacement by the drive device 18 when the drive device 18 performs the second stroke portion. Thus, the second lever arm 164 is controlled in displacement when the actuator 16 controls the closing of the latch.

These are the lever arms 162, 164 which vary the reduction ratio making it possible to vary the speed and the torque at the output of the reducer 161.

The first lever arm 162 and the second lever arm 164 are movable. They are driven by the actuator 16 via the drive device 18.

The reducer 161 may include a transmission device 19 configured to be driven by the drive device 18. The transmission device 19 may be configured to drive the first 162 and second 164 lever arms. More particularly, in the variant in which the drive device 18 is a wheel, the first lever arm 162 can be movable in rotation around a first axis of rotation A and the second lever arm 164 can be movable in rotation around a second axis of rotation B.

The transmission device 19 can be a wheel the displacement stroke of which is a rotation.

In the variant, not represented, in which the actuator 16 is movable in translation, the first lever arm 162 and the second lever arm 164 are movable in translation.

The first lever arm 162 is configured to drive the pawl 122 into the open position of the latch, and the second lever arm 164 is configured to drive the bolt 121 into the closed position of the latch.

As shown in FIG. 1, the second lever arm 164 may be shorter than the first lever arm 162. In this manner, the first reduction ratio is lower than the second reduction ratio.

Figure 2:
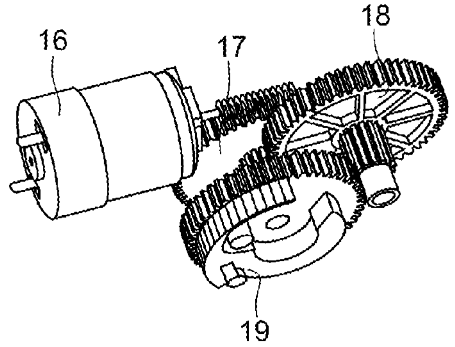
FIG. 2 is a schematic perspective view of a part of the opening and closing assistance mechanism of FIG. 1, seen from above.
Figure 3:
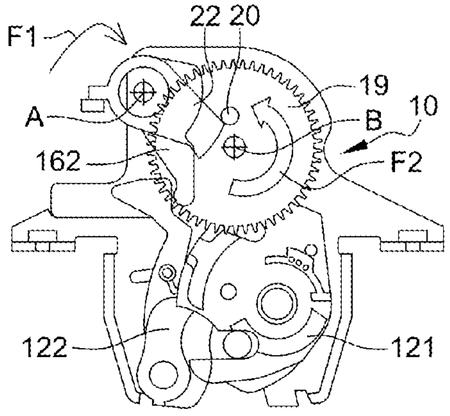
FIG. 3 is a partial schematic view of a part of the opening/closing assistance mechanism of FIG. 1, seen from a second side opposite the first side, illustrating an action of opening a latch according to the present disclosure.
Figure 4:
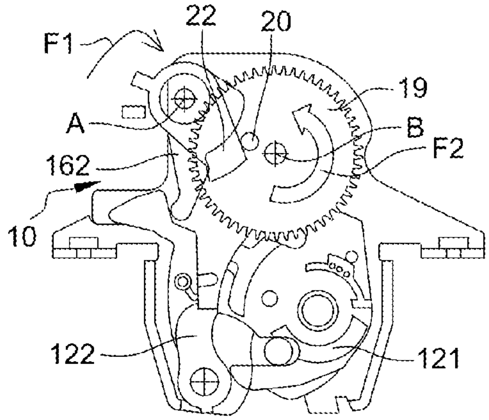
FIG. 4 is a partial schematic view of the opening/closing assistance mechanism of FIG. 1, similar to FIG. 3 but illustrating a continuation of the action of opening the latch.

As shown in particular in FIG. 2, the reducer 161 may include a first wheel 17 driven in rotation by the actuator 16, for example via a worm screw of the actuator 16, a second wheel 18 driven in rotation by the first wheel 17, in order to form a pinion, and a third wheel 19 driven by the second wheel 18 in order to form a pinion. In this form, the second wheel 18 is the drive device as previously described. Furthermore, in this form, the third wheel 19 is the transmission device 19 as previously described.

The drive device 18 may have an axis of rotation coinciding with the axis of rotation A of the first lever arm 162. The drive device 18 may be configured to be driven in rotation around the axis of rotation A in a first direction of rotation F1 (FIGS. 3 to 9) and in a second direction of rotation F2 opposite to the first direction of rotation F1 (FIGS. 10A-10D).

As will be seen later, the first direction of rotation F1 may correspond to the direction of displacement of the drive device 18 to perform the first and second stroke portions. The second direction of rotation F2 can correspond to a third stroke portion of the drive device 18, which corresponds, for example, to a reset of the opening/closing assistance mechanism 10.

The drive device 18 can be configured to drive in rotation the first lever arm 162 in order to control the opening of the latch 12. The drive device 18 can be configured to drive in rotation the second lever arm 164 in order to control the closing of the latch 12.

More specifically, the drive device 18 can be configured to drive the transmission device 19 in order to drive the first 162 and second 164 lever arms. The transmission device 19 may have an axial pin 20 configured to cooperate with a gate 22 of the first lever arm 162. The first lever arm 162 may be driven in rotation by the axial pin 20. The drive device 18 may be configured to drive the first lever arm 162 via the axial pin 20 of the transmission device 19. The drive device 18 is therefore a means for driving the first lever arm 162.

Thus, the first lever arm 162 can have a gate 22 configured to be driven by the transmission device 19, for example via the axial pin 20.

The gate 22 can be configured to be driven by the axial pin 20 of the transmission device 19 when the drive device 18 performs the first stroke portion.

Thus, the gate 22 can be configured to be driven by the axial pin 20 of the transmission device 19 when the electric actuator 16 controls the opening of the latch 12.

The second lever arm 164 is, for example, disposed on the transmission device 19 so that the transmission device 19 has an axis of rotation coinciding with the second axis of rotation B of the second lever arm 164. The second lever arm 164 is driven in rotation by the drive device 18 via the transmission device 19. The drive device 18 is therefore a means for driving the second lever arm 164.

FIGS. 3 to 6 illustrate the opening of a latch by way of a rotary actuator. Alternatively, the actuator 16 could be a linear actuator, movable in translation.

Figure 5:
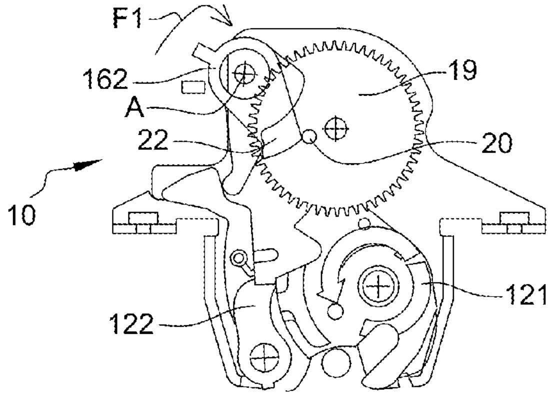
FIG. 5 is a partial schematic view of the opening/closing assistance mechanism of FIG. 1, similar to FIG. 4 but illustrating the further continuation of the action of opening the latch.
Figure 6A:
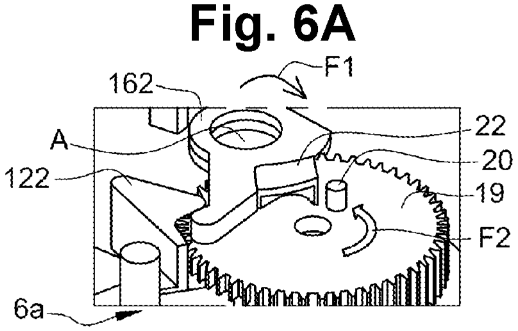
FIGS. 6A-6D are a series of schematic perspective views of a part of the opening/closing assistance mechanism of FIG. 1, illustrating the steps for opening the latch according to the present disclosure.
Figure 6B:
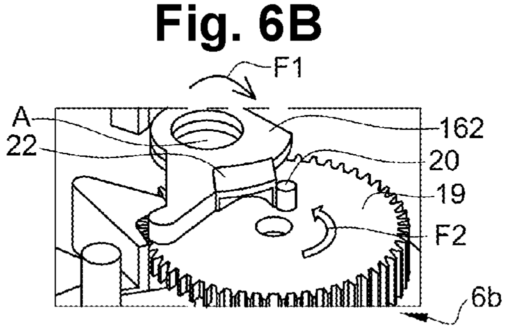
Figure 6C:
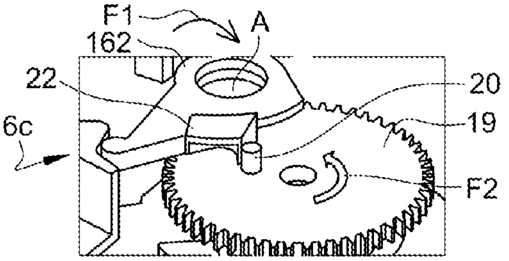
Figure 6D:
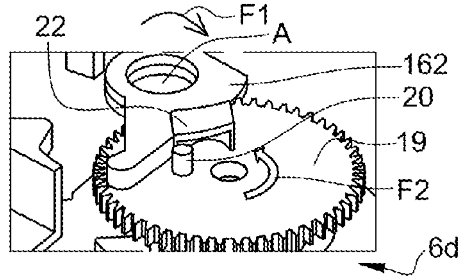

More specifically, the actuator 16 is controlled in displacement so as to drive in rotation the drive device 18 around the axis of rotation A in the first direction of rotation F1. The drive device 18 then performs a first stroke portion in order to drive the first lever arm 162 from an initial position (FIG. 3) to a final position (FIG. 5). The first lever arm 162 allows to control the latch in the open position. Even more specifically, the first lever arm 162 causes the pawl 122 to be displaced away from the bolt 121. The bolt 121 is then capable of being movable to allow the passage of the latch 12 from the closed position to the open position. The displacement of the bolt 121 allowing the passage of the latch 12 from the closed position to the open position is, for example, carried out under the effect of a spring, or else of the decompression of a door seal, or a motorization of the door leaf, which causes a displacement of the door leaf 100 (FIG. 14) into the position of opening of the door leaf. The drive device 18 then causes the pawl 122 to move away from the bolt 121, via a rotational movement of the first lever arm 162 driven by the axial pin 20.

The actuator 16, controlled in displacement to allow the opening of the latch 12, can drive the first wheel 17 which drives the second wheel 18 which drives the third wheel 19. The third wheel 19 can drive in rotation the first lever arm 162 via the axial pin 20.

More specifically, the axial pin 20 drives the gate 22 of first lever arm 162 in order to drive the first lever arm 162.

FIGS. 6A-6D show, more particularly, the displacement of the axial pin 20 that drives the gate 22 of first lever arm 162, in four steps. The first three steps (FIGS. 6A, 6B and 6C) show that the axial pin 20 is disposed on a first side of the gate 22 in order to displace the gate 22. During the rotation of the drive device 18 in the first direction of rotation F1 to perform the first stroke portion, the transmission device 19 is driven in the second direction of rotation F2. Thus, the pin 20 makes it possible to displace the gate 22 of the first lever arm 162 in order to drive the pawl 122. During these first three steps (FIGS. 6A, 6B, 6C), the first lever arm 162 passes from the initial position (FIG. 3) to the final position (FIG. 5). The fourth step (FIG. 6D) shows that the axial pin 20 passes from the first side of the gate 22 to a second side of the gate 22 when the drive device 18 has completed the first stroke portion. When the axial pin 20 is on the second side of the gate 22, the first lever arm 162 is released from its contact with the axial pin 20 and returns to the initial position. Thus, when the first lever arm 162 has driven the pawl 122 away from the bolt 121, the axial pin 20 passes from the second side of the gate 22 such that the first lever arm 162 returns to the initial position.

Figure 7:
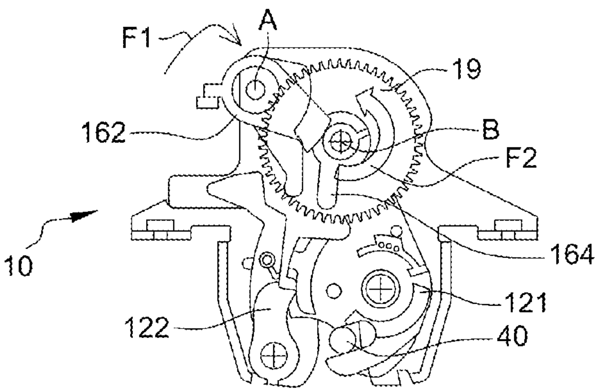
FIG. 7 is a partial schematic view of part of the opening/closing assistance mechanism of FIG. 1, seen from the second side opposite the first side, illustrating an action of closing the latch according to the present disclosure.
Figure 9:
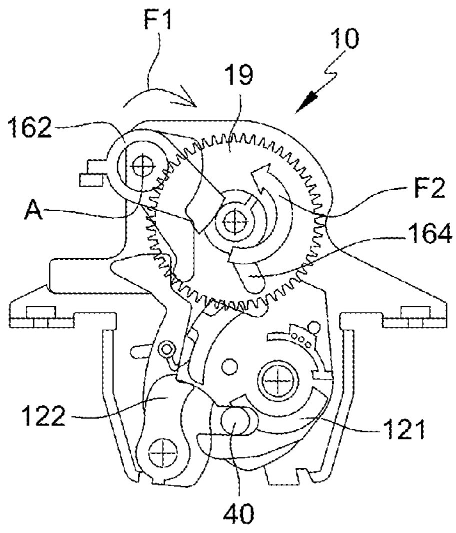
FIG. 9 is a partial schematic view of the opening/closing assistance mechanism of FIG. 1, similar to FIG. 8 but illustrating the further continuation of the action of closing the latch.
Figure 10A:
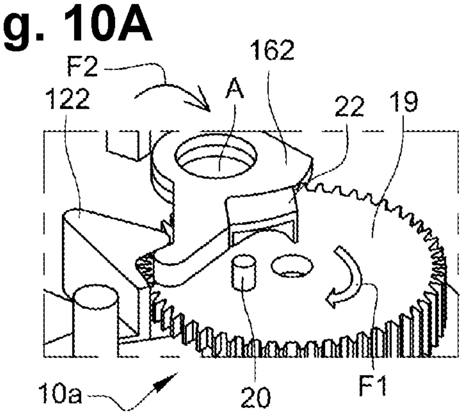
FIGS. 10A-10D are a series of schematic perspective views of a part of the opening/closing assistance mechanism of FIG. 1, illustrating the actions of resetting the opening/closing assistance mechanism making it possible to pass from a closed position to an open position of a latch according to the present disclosure.
Figure 10B:
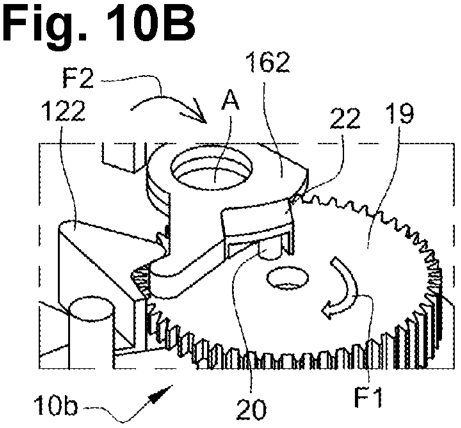
Figure 10C:
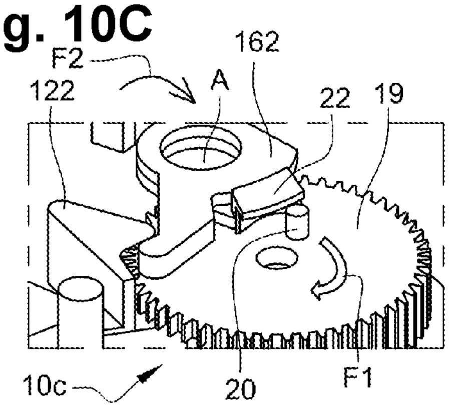
Figure 10D:
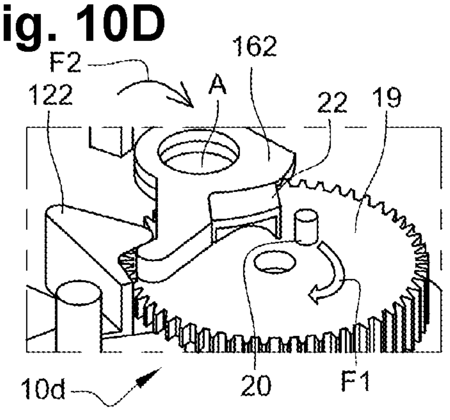

FIGS. 7 to 9 illustrate the closing of a latch by way of a rotary actuator. Alternatively, the actuator 16 could be a linear actuator movable in translation.

More specifically, the actuator 16 is controlled in displacement so as to drive in rotation the drive device 18 around the axis of rotation A in the first direction of rotation F1. The drive device 18 then performs a second stroke portion in order to bring the second lever arm 164 into contact with the bolt 121. The second lever arm 164 allows controlling the latch 12 in the closed position. Even more specifically, the second lever arm 164 drives the bolt 121 in displacement around a striker 40 in order to allow the latch 12 to be closed. The drive device 18 then causes the bolt 121 to be displaced, via a rotational movement of the second lever arm 164. When the drive device 18 rotates in the first direction of rotation F1 to perform the second stroke portion, the transmission means 19 is driven in the second direction of rotation F2 and brings the second lever arm 164 into contact with the bolt 121.

The bolt 121 is driven by the second lever arm 164, which then makes it possible to control the latch 12 in the closed position. More specifically, the second lever arm 164 causes the bolt 121 to be displaced into the closed position.

The actuator 16, controlled in displacement to allow the closing of the latch 12, can drive the first wheel 17 which drives the second wheel 18 which drives the third wheel 19. The third wheel 19 can drive in rotation the second lever arm 164.

FIGS. 10A-10D illustrate four steps for resetting the opening/closing assistance mechanism 10, making it possible to pass from an end-of-closing position to a ready-to-open position of the latch 12. These four resetting steps (FIGS. 10A to 10D) make it possible to move the axial pin 20 from the second side of the gate 22 to the first side of the gate 22. For this purpose, the actuator 16 drives in rotation the drive device 18 in the second direction of rotation F2 opposite to the first direction of rotation F1. The displacement of the drive device 18 in the second direction of rotation F2 is a third stroke portion of the drive device 18. During the rotation of the drive device 18 in the second direction of rotation F2 to perform the third stroke portion, the transmission means 19 is driven in the first direction of rotation F1. Thus, the axial pin 20 of the transmission device 19 enters the gate 22 of the first lever arm 162 then passes from the second side of the gate 22 to the first side of the gate 22. The axial pin 20 is then ready to allow driving the gate 22 so that the first lever arm 162 drives the pawl 122 in the open position of the latch 12.

This mechanical resetting operation is automatic. It makes it possible to refrain from an additional action, for example, via a switch, aimed at positioning the opening/closing assistance mechanism in an intermediate position, between the opening and the closing positions.

Thus, the drive device 18 is configured to drive the first lever arm 162 and the second lever arm 164.

In order to make the first lever arm 162 able to drive the pawl 122 in the open position of the latch 12, the axial pin 20 of the transmission device 19 must be disposed on the first side of the gate 22 (FIG. 7).

The first stroke portion and the second stroke portion are performed in the first direction of rotation F1. The second stroke portion is larger than the first stroke portion. In order to make the second lever arm 164 able to drive the bolt 121 into the closed position, the drive device 18 must perform a displacement in the first direction of rotation F1 greater than the displacement in the first direction of rotation F1 allowing to drive the pawl 122 into the open position of the latch 12, via the first lever arm 162.

In a variant not represented, the drive device 18 can be configured to be driven in rotation around the axis of rotation A in the first direction of rotation F1, called opening direction, in order to drive the first lever arm 162 so as to cause the opening of the latch 12, and in the second direction of rotation F2, called closing direction, in order to drive the second lever arm 164 so as to cause the closing of the latch 12.

Figure 11:
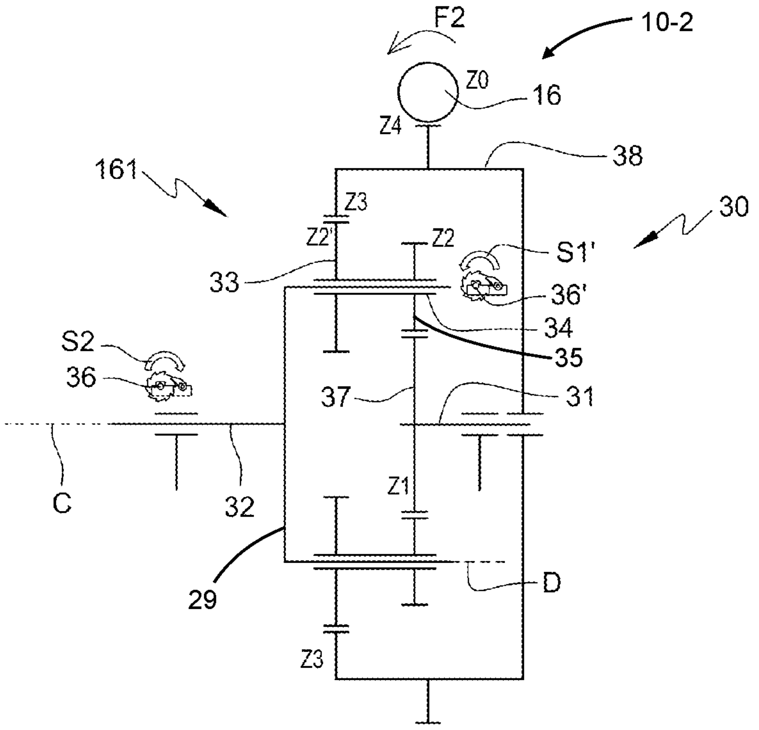
FIG. 11 is a schematic view of a mechanism for assisting the opening/closing of a latch for a door leaf according to a second form of the present disclosure, illustrated in the closed position.
Figure 12:
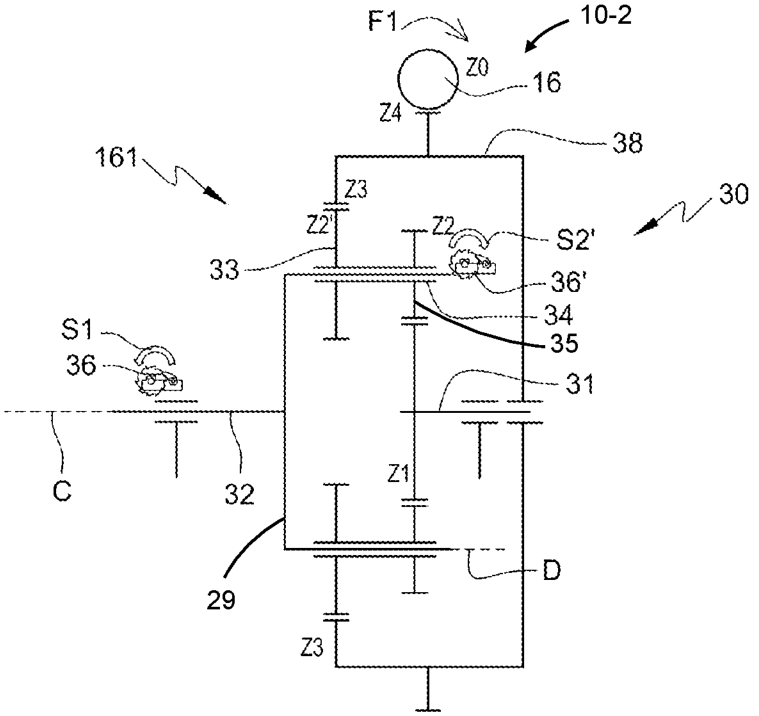
FIG. 12 is a schematic view of the opening/closing assistance mechanism of FIG. 11, illustrated in the open position.
Figure 13:
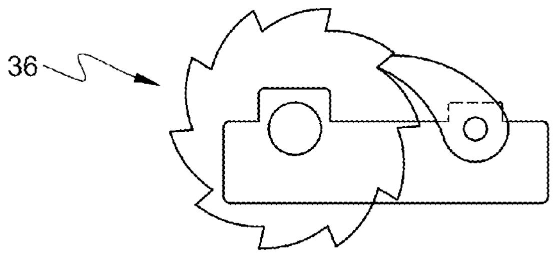
FIG. 13 is a schematic view of a blocking device of the opening and closing assistance mechanism of FIG. 11.

FIGS. 11 to 13 represent an opening/closing assistance mechanism 10-2 for assisting the opening/closing of a latch 12 (FIG. 1) for a door leaf 100 (FIG. 14) of a motor vehicle, according to a second form. The opening/closing assistance mechanism 10-2 can be similar to the opening/closing assistance mechanism 10 (FIGS. 1-10) except as otherwise shown or described herein. Accordingly, similar numbers are used to identify similar features and only differences are described in detail herein.

In this second form, the latch 12 (FIG. 1) is, for example, integrated into a housing 14 (FIG. 1), in the same way as in the first form.

In addition, the latch 12 (FIG. 1) is movable between an open position and a closed position of the latch. When the latch 12 is in the closed position, it allows blocking the door leaf 100 (FIG. 14) in the closed position. Alternatively, when the latch 12 is in the open position, it unblocks the door leaf 100, so that it can pass from the closed position to the open position. The latch 12 may be an electric latch. The latch 12 may include a bolt 121 (FIG. 1) and a pawl 122 (FIG. 1) movable between the closed position of the latch and the open position of the latch.

In this second form, the opening/closing assistance mechanism 10-2 includes an electric actuator 16 configured to control the closing and the opening of the latch 12 (FIG. 1). The actuator 16 is associated with a reducer 161 including a drive device 38 configured to perform a displacement stroke including a first stroke portion for opening the latch 12, and a second stroke portion for closing the latch 12.

Referring back to FIGS. 1 to 10, as for the first form, the reducer 161 has a first reduction ratio for opening the latch 12, that is to say, on the first stroke portion, and a second reduction ratio for closing the latch 12, that is to say, on the second stroke portion. The second reduction ratio is different from the first reduction ratio. The reducer 161 then has a first reduction ratio when the actuator 16 controls the opening of the latch 12, and a second reduction ratio when the actuator 16 controls the closing of the latch 12. The actuator 16 is configured to control the drive device 38. The first reduction ratio is advantageously lower than the second reduction ratio. In this manner, a high torque is provided for closing the latch, while a high speed is provided for opening the latch.

Returning to FIGS. 11 to 13, this second form differs from the first form in that the reducer 161 includes a planetary gear train 30.

The planetary gear train 30 may include the drive device 38, also called ring gear, at least a first stage 32, and a second stage 34.

The drive device 38 can be a first pinion of the planetary gear train 30, the displacement stroke of which is a rotation. Accordingly, the drive device 38 is also referred to herein as the first pinion 38.

The drive device 38 can be configured to be driven in rotation in the first direction of rotation F1 and in the second direction of rotation F2 opposite to the first direction of rotation F1.

The first stroke portion of the drive device 38 can be performed in a first direction of rotation F1, and the second stroke portion can be performed in a second direction of rotation F2 opposite to the first direction of displacement F1.

The planetary gear train 30 may include an output shaft 31, for example forming a lever arm. The output shaft 31 can be controlled in displacement by the drive device 38 when the drive device 38 performs the first stroke portion and/or the second stroke portion. The output shaft 31 can be controlled in displacement in a first direction when the drive device 38 performs the first stroke portion, and in a second direction when the drive device 38 performs the second stroke portion. Thus, the output shaft 31 is controlled in displacement by the drive device 38 when the drive device 38 performs the first stroke portion, and when the drive device 38 performs the second stroke portion. The drive device 38 is therefore configured to drive in rotation the output shaft 31 in order to control the opening and the closing of the latch 12 (FIG. 1).

The first stage 32 may have an axis of rotation C. The rotation of the first stage 32 around the axis of rotation C is allowed in a first direction of rotation S1 and blocked in a second direction of rotation S2, opposite to the first direction of rotation S1. The second stage 34 may have an axis of rotation D. The rotation of the second stage 34 around the axis of rotation D is allowed in a first direction of rotation S1' and blocked in a second direction of rotation S2'.

When the drive device 38 performs the second stroke portion in the second direction of rotation F2, corresponding to a latch closing control (FIG. 11), the rotation of the second stage 34 is allowed in the first direction of rotation S1' and the rotation of the first stage 32 is blocked in the second direction of rotation S2.

When the drive device 38 performs the first stroke portion in the first direction of rotation F1, corresponding to a latch opening control (FIG. 12), the rotation of the first stage 32 is allowed in the first direction of rotation S1 and the rotation of the second stage 34 is blocked in the second direction of rotation S2'.

The first directions of rotation S1 and S1' correspond herein to the same direction of rotation, for example, a counterclockwise direction, and the second directions of rotation S2 and S2' correspond to the opposite direction, for example, a clockwise direction.

More specifically, the planetary gear train 30 may include a planet carrier 29 and at least one planet gear carried by the planet carrier 29. The first stage 32 corresponds to the planet carrier 29, and the second stage 34 corresponds to the planet gear(s). Thus, the planet carrier 29 of the first stage 32 can be blocked in rotation around its axis of rotation C in the second direction of rotation S2, for example, thanks to a blade brake or a first ratchet wheel 36; and the planet gear(s) of the second stage 34 can be blocked in rotation around its axis of rotation D in the second direction of rotation S2', for example, thanks to a blade brake or a second ratchet wheel 36'. Thus, the planet carrier 29 of the first stage 32 can be blocked in rotation around its axis of rotation C in the second direction of rotation S2, by a first locking device such as a blade brake or the first ratchet wheel 36; and the planet gear(s) of the second stage 34 can be blocked in rotation around its axis of rotation D in the second direction of rotation S2', by a second blocking device such as a blade brake or the second ratchet wheel 36'. In addition, the planet gear(s) of the second stage 34 is movable in rotation around the axis of rotation C of the planet carrier 29 of the first stage 32.

FIG. 13 illustrates a blocking device such as the ratchet wheel 36.

Returning to FIGS. 11 to 12, the reducer 161 includes the planetary gear train 30 and the first and second ratchet wheels 36, 36'.

The planetary gear train 30 may include the first pinion 38 driven in rotation by the actuator 16, for example, via a worm screw of the actuator 16, first and second planet gears 33 and 35 driven in rotation by the first pinion 38, the planet carrier 29 of the first stage 32 driven in rotation by the first and second planet gears 33 and 35, and a second pinion 37 driven in rotation by the second planet gear 35.

As described hereinabove, in this form, the first pinion 38 is the drive device 38 as previously described, the planet carrier 29 corresponds to the first stage 32 as previously described, and the second planet gears 33 and 35 correspond to the second stage 34 as previously described.

When the actuator 16 controls the closing of the latch 12 (FIG. 1), the second stage 34 is driven in rotation in the first direction of rotation S1' around its axis of rotation D by the drive device 38 (via the first planet gear 33), when the drive device 38 performs the second stroke portion in the second direction of rotation F2. In addition, the second stage 34 being configured to cause the rotation of the first stage 32 around the axis of rotation C in the second direction S2. However, as indicated hereinabove, the first stage 32 is configured to be locked in rotation in the second direction of rotation S2 around its axis of rotation C. Thus, when the actuator 16 controls the closing of the latch 12, the rotation of the first stage 32 is blocked. The second stage 34 then drives the output shaft 31 via the second pinion 37 in order to control the closing of the latch 12. The output shaft 31 can drive the bolt 121 (FIG. 1) into the closed position of the latch 12. Thus, when the actuator 16 controls the closing of the latch 12, the drive device 38 drives the output shaft 31 via the second stage 34.

When the actuator 16 controls the opening of the latch 12 (FIG. 1), the drive device 38 performs the first stroke portion in the first direction of rotation F1. In this first direction of rotation F1, the drive device 38 is configured to drive the second stage 34 in the second direction S2'. However, as indicated hereinabove, the second stage 34 is blocked in rotation around its axis of rotation D in the second direction of rotation S2'. Since the second stage 34 is blocked, it does not allow the second pinion 37 to be driven directly. When drive device 38 performs the first stroke portion, the second stage 34 being blocked in rotation in the second direction S2', it is therefore driven in rotation around the axis of rotation C of the first stage 32, via the first stage 32 in the first direction of rotation S1. In this case, the drive device 38, the first stage 32, the second stage 34 and the second pinion 37 are integral in rotation and form a unit driving the output shaft 31 in order to control the opening of the latch. The output shaft 31 can drive the pawl 122 (FIG. 1) away from the bolt 121 (FIG. 1), so as to allow the bolt 121 to be movable to enable the opening of the latch 12.

When the actuator 16 controls the closing of the latch 12 (FIG. 1), the reduction ratio of the reducer 161 is higher than when the actuator 16 controls the opening of the latch 12.

When the actuator 16 controls the closing of the latch 12 (FIG. 1), the torque generated by the reducer 161 is higher than when the actuator controls the opening of the latch 12.

When the actuator 16 controls the opening of the latch 12 (FIG. 1), the reduction ratio of the reducer 161 is lower than when the actuator 16 controls the closing of the latch 12.

When the actuator 16 controls the opening of the latch 12 (FIG. 1), the speed generated by the reduction gear is higher than when the actuator 16 controls the closing of the latch 12.

When the actuator 16 controls the closing of the latch 12 (FIG. 1), a high torque is provided.

When the actuator 16 controls the opening of the latch 12 (FIG. 1), a high speed is provided.

More specifically, FIGS. 11 and 12 illustrate a planetary gear train 30 where the planet carrier 29 of the first stage 32 is configured to be blocked in rotation in the second direction of rotation S2 around its axis of rotation C and the second pinion 37 has a toothing Z1.

The second planet gear 35, carried by the planet carrier 29 of the first stage 32, is configured to be blocked in rotation in the second direction of rotation S2' around its axis of rotation D. The second planet gear 35 has a toothing Z2 connected to the toothing Z1 of the second pinion 37. The first planet gear 33 is carried by the planet carrier 29 of the first stage 32 and has a toothing Z2'.

The first pinion 38 has a first toothing Z3 connected to the toothing Z2' of the second planet gear 35 and a second toothing Z4.

The blade brakes 36 are configured to respectively block the planet carrier 29 of the first stage 32 in rotation in the second direction of rotation S2 around its axis of rotation C, and the second planet gear 35 in rotation in the second direction of rotation S2' around its axis of rotation D.

The second toothing Z4 of the first pinion 38 is connected to a worm screw of the actuator 16 having a toothing Z0.

FIG. 11 illustrates the actuator 16 controlling the closing of the latch 12 (FIG. 1). It drives in rotation the first toothing Z3 and the second toothing Z4 of the first pinion 38. The first toothing Z3 of the first pinion 38 drives the toothing Z2' and the toothing Z2 of the first 33 and second 34 planet gears carried by the planet carrier 29 of the first stage 32 in the first direction of rotation S1'. In addition, the first and second planet gears 33 and 35 are configured to rotate around the axis of rotation C of the planet carrier 29 of the first stage 32 in the second direction of rotation S2 opposite to the first direction of rotation S1' of the planet gears 33 and 35 of the second stage 34, in order to drive it in rotation. However, the planet carrier 29 of the first stage 32 is blocked in rotation in the second direction of rotation S2 around its axis of rotation C by the blade brake 36. Thus, the first and second planet gears 33 and 35 do not rotate around the axis of rotation C of the planet carrier 29 of the first stage 32. The toothing Z2 of the second planet gear 35 drives the toothing Z1 of the second pinion 37 and thus drives the second pinion 37 in rotation. The second pinion 37 then drives the output shaft 31 in order to control the closing of the latch 12. The output shaft 31 can drive the bolt 121 (FIG. 1) in the closed position of the latch 12.

FIG. 12 illustrates the actuator 16 controlling the opening of the latch 12 (FIG. 1). It drives in rotation the first toothing Z3 and the second toothing Z4 of the first pinion 38. The first toothing Z3 of the first pinion 38 drives the toothing Z2' of the first planet gear 33, and seeks to drive the toothing Z2 of the second planet gear 35, in the second direction of rotation S2 opposite to the first direction of rotation S1' of the planet gears 33 and 35 of the second stage 34. However, the second planet gear 35 is blocked in rotation in the second direction of rotation S2' around its axis of rotation D by the blade brake 36. Thus, the second planet gear 35 does not rotate around its axis of rotation D and does not drive the toothing Z1 of the second pinion 37. In addition, the first and second planet gears 33 and 35 rotate around the axis of rotation C of the planet carrier 29 of the first stage 32 in the first direction of rotation S1 of the planet carrier 29 of the first stage 32, in order to drive it in rotation. The first pinion 38, the planet carrier 29 of the first stage 32, the planet gears 33 and 35 and the second pinion 37 are therefore integral in rotation and form a unit driving the output shaft 31 in order to control the opening of the latch 12. The output shaft 31 can drive the pawl 122 (FIG. 1) in the open position of the latch 12.

When closing the latch 12, the reduction ratio is calculated according to the following Willis formula:

$$r = Z4/Z0 \cdot (Z3 \cdot Z2)/(Z2' \cdot Z1) \cdot (-1)^{y} \quad \text{[Math. 1]}$$

With:

r corresponding to the reduction ratio, and y corresponding to the number of external contacts in the pinions, making it possible to define the direction of rotation at the output of the planetary gear train 30.

When opening the latch 12 (FIG. 1), the reduction ratio is equal to 1.

Although the present invention has been described with reference to specific embodiments, it is obvious that modifications and changes can be made to these examples without departing from the general scope of the invention as defined by the claims. In particular, individual features of the different illustrated/mentioned embodiments can be combined in additional embodiments. Accordingly, the description and the drawings should be considered in an illustrative rather than restrictive sense.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An opening/closing assistance mechanism for assisting opening and closing of a latch of a door leaf, the opening/closing assistance mechanism comprising:

an electric actuator configured to control a closing and an opening of the latch, the electric actuator including a reducer comprising a drive device configured to perform a displacement stroke, wherein the displacement stroke comprises a first stroke portion for opening the latch and a second stroke portion for closing the latch, wherein the reducer includes a first reduction ratio on the first stroke portion and a second reduction ratio on the second stroke portion, the first reduction ratio being different from the second reduction ratio, wherein the reducer comprises a first lever arm controlled in displacement by the drive device when the drive device performs the first stroke portion, a second lever arm controlled in displacement by the drive device when the drive device performs the second stroke portion, and a transmission device configured to be driven by the drive device, and to drive cause the first and second lever arms to pivot around a first axis and a second axis, respectively, the first axis being different from the second axis, the second lever arm being disposed on the transmission device so that the transmission device has an axis of rotation coinciding with the second axis the second lever arm, and wherein at least one of the transmission device and the drive device is a wheel, and the displacement stroke is a rotation.

2. The opening/closing assistance mechanism according to claim 1, wherein the first reduction ratio is lower than the second reduction ratio.

3. The opening/closing assistance mechanism according to claim 1, wherein when the drive device performs the first stroke portion, the reducer is configured to generate a first torque and when the drive device performs the second stroke portion, the reducer is configured to generate a second torque, the second torque being greater than the first torque.

4. The opening/closing assistance mechanism according to claim 1, wherein when the drive device performs the first stroke portion, the reducer is configured to generate a first speed and when the drive device performs the second stroke portion, the reducer is configured to generate a second speed, the first speed being greater than the second speed.

5. The opening/closing assistance mechanism according to claim 1, wherein the second lever arm is shorter than the first lever arm.

6. The opening/closing assistance mechanism according to claim 1, wherein the transmission device comprises a pin disposed axially on the transmission device, and the first lever arm comprises a gate configured to be driven by the pin when the drive device performs the first stroke portion.

7. The opening/closing assistance mechanism according to claim 6, wherein the pin is configured to pass from a first side of the gate to a second side of the gate when the drive device performs the first stroke portion, and the pin is configured to pass from the second side of the gate to the first side of the gate when the drive device performs a third stroke portion.

8. A latch comprising:

an opening/closing assistance mechanism according to claim 1;

a bolt and a pawl movable between an open position of the latch and a closed position of the latch, wherein the drive device is configured to drive the bolt into the closed position of the latch when the drive device performs the second stroke portion, and the drive device being configured to drive the pawl into the open position of the latch when the drive device performs the first stroke portion.

9. The opening/closing assistance mechanism according to claim 1, wherein the first lever arm is pivotable relative to the transmission device.

10. The opening/closing assistance mechanism according to claim 9, wherein the first axis is offset from a rotational axis of the transmission device.

11. The opening/closing assistance mechanism according to claim 9, wherein the transmission device comprises a pin disposed axially on the transmission device, and the first lever arm is pivotable by the pin.

12. The opening/closing assistance mechanism according to claim 1, wherein the transmission device is rotatable around an axis that is fixed relative to the drive device.

* * * * *